United States Patent [19]

Schwartz

[11] 3,897,145

[45] July 29, 1975

[54] RECORDING AND SCANNING MECHANISM FOR A SOUND SLIDE PROJECTOR

[75] Inventor: Morris Schwartz, Plainville, Conn.

[73] Assignee: Kalart Victor Corporation, Plainville, Conn.

[22] Filed: Oct. 1, 1973

[21] Appl. No.: 402,168

[52] U.S. Cl. .................................. 353/19; 353/120

[51] Int. Cl.$^2$ .......................................... G03B 31/06

[58] Field of Search ............................... 353/15–19, 353/120; 274/4 H, 4 J

[56] References Cited

UNITED STATES PATENTS

| | | | |
|---|---|---|---|
| 2,519,592 | 8/1950 | Muller | 274/4 H |
| 2,537,657 | 1/1951 | D'Humy | 274/4 H |
| 2,929,633 | 3/1960 | Hoshine | 274/4 J |
| 3,251,263 | 5/1966 | Gerry | 353/19 |
| 3,296,925 | 1/1967 | Yamamoto | 353/120 |
| 3,717,407 | 2/1973 | Dimitracopoules | 353/19 |

*Primary Examiner*—Richard E. Aegerter
*Assistant Examiner*—A. Jason Mirabito
*Attorney, Agent, or Firm*—Hane, Baxley & Spiecens

[57] ABSTRACT

There is disclosed a playback and recording assemblage for a sound slide projector. This assemblage includes sound slides which are coated on opposite sides of a widened frame portion with magnetic layers. These layers serve to record thereon sound tracks in spaced apart parallel relationship. Recording or playback of such sound tracks is effected by one or more pairs of sound heads which are alternately moved into and out of contact with the two layers so that one head of a pair coacts with one layer and the other head of the pair coacts with the other layer, and so forth, until all sound tracks on both layers are alternately but in sequence recorded or played back, thereby completing a message on the two sides of the sound slide. Upon completion of the message the sound heads are returned to their respective starting positions whereupon recording or playback of a message on another slide may be started.

16 Claims, 8 Drawing Figures

RECORDING AND SCANNING MECHANISM FOR A SOUND SLIDE PROJECTOR

The present invention relates to a sound-slide projector, and more particularly to the recording and playback assemblage for such projector.

BACKGROUND

It has been found desirable since quite a number of years to associate transparencies, commonly referred to as slides, with an audible message. Obviously, such association makes the slides more useful for training and educational purposes, and also increases the enjoyment of slides taken and projected by amateurs.

Various arrangements suitable for the purpose have been developed over the years. There are known slide projectors coacting with a suitable playback device such as a tape recorder or a phonograph using grooved record discs. Coaction between the projector and the playback device is usually effected by causing the playback mechanism to generate signals of suitable frequency which activate the projector to advance successive slides into the projection and playback position. Such an arrangement has the disadvantage that is requires setting up when it is to be used and also requires rather considerable space. Moreover, there is always a danger that the sound tracks to be associated with a selected sequence of slides are lost or that there is a mismatching of the visual messages to be projected and the audible messages.

Another approach which has been developed is to use photographically recorded sound tracks in the form of film strips in which picture frames and sound track frames alternate. The projector is equipped to scan the sound tracks while the associated picture is projected and to be activated at the end of the audible message to move another picture frame and sound frame into position for presentation. Projectors of this kind have the advantage that they avoid the need for setting up a projector slide and a physically separated playback device, and they also preclude the mismatching of visible and audible messages.

The applicant and also the assignee in this case have been engaged for several years in the development of devices combining visual and audible messages. Strip film projectors of the just-before referred to type are disclosed, for instance, in U.S. Pat. No. 3,001,444.

Another approach also developed by the applicant and the assignee herein is to include in a cassette a photographic slide and a tape on which the message associated with the slide is recorded. A sound slide projector for use with cassettes of this kind is equipped to play back the message recorded on the tape while projecting the associated slide and then automatically to move another cassette into the presentation position. Sound slide projectors and cassettes therefor are disclosed, for instance in U.S. Pat. Nos. 3,232,167, 3,408,139 and 3,561,856.

Still another approach also developed by the applicant herein and the assignee is to provide a common frame for a picture slide and a sound track carrier. Such frame has a portion mounting a transparency and a portion constituting a sound track carrier either in the form of a grooved record disc or of a magnetic recording. The applicant and the assignee have also developed projectors accepting frames of this kind. For instance, U.S. Pat. No. 2,961,922 discloses a frame combining a slide carrier and a record carrier and a projector accepting such frames.

One of the problems present with a combination of a transparency and a sound record associated therewith is to accommodate a maximal recorded message within the minimal desirable space. The assignee herein has disclosed in U.S. Pat. No. 3,185,776 a sound slide which provides sound track areas on opposite sides of the frame of the slide. This patent also discloses means for playing back the sound tracks and projecting the pictures mounted in the slide.

While the afore-referred to approaches to combine a visual message and an audible message on a common carrier for projection and playback respectively have certain advantages, the applicant and the assignee herein, on the basis of their many years of development work in this area, feel that further improvements are necessary to arrive at a technically and economically more fully satisfactory solution. The present invention is concerned with such further improvements.

THE INVENTION

It is a broad object of the present invention to provide a novel and improved sound slide which carries both a transparency and a sound track area of maximal size in relation to the overal dimensions of the slide.

Another broad object of the invention is to provide a novel and improved mechanism capable of recording sound tracks on magnetic layers on both sides of a sound slide which also carries a transparency and is also capable of scanning sound tracks recorded on these layers.

A more specific object of the invention is to provide a novel and improved recording and scanning mechanism with one or more pairs of sound heads; one head of each pair being arranged to coact with one of the layers on the sound slide and the other with the second layer, said heads being controlled so that they alternately and successively record sound tracks on the layers or play back recorded sound tracks thereby optimally utilizing the available surface areas on the sound slide.

Another more specific object of the invention is to provide a novel and improved recording and scanning mechanism which permits a projector design such that the projector is capable of accepting either sound slides according to the inventionor standard slides.

Other and further objects, features and advantages of the invention will be pointed out hereinafter and set forth in the appended claims.

SUMMARY OF THE INVENTION

The afore-pointed out objects, features and advantages, and other objects, features and advantages which will be pointed out hereinafter are obtained by providing a playback and recording assemblage for a sound slide projector which includes a recording and playback mechanism and sound slides for use with such mechanism. These sound slides have a frame including a first portion defining a window for accommodating therein a transparency to be projected by the projector, and a second portion constituting a sound track carrier. This carrier is coated on opposite sides with layers of magnetic material for recording thereon sound tracks or playing back such sound tracks. The recording and playback mechanism includes one or more pairs of sound heads for recording sound tracks on the layers and scanning the same. The sound heads are supported by a carrier which is linearly displaceable and also rotatable. The heads are arranged on the carrier in circumferentially spaced relationship so that they will rotate about a common axis when and while the carrier is displaced and rotated. Each of the heads is movable into and out of engagment with one of said layers. A reversible first drive means is coupled with the carrier for linearly displacing the same parallel to the magnetic layers between a starting position and an end position, thereby moving the sound heads relative to the layers. Rotary second drive means are also coupled to the carrier for rotating the same when and while the carrier is driven from its starting position toward its end position, the combined movements of the two drive means thereby imparting to the heads' movements along spaced apart paths relative to the layers. Actuating means coact with the heads for alternately moving the same into and out of co-acting relationship with the layers when and while the carrier is displaced toward the end position for recording on each of the layers sound tracks or playing back such sound tracks. The actuating means move both heads out of coacting relationship with the layers when and while the carrier is returned to its starting position.

A stationary holder arrangement is provided for releasably holding the slide in a position for coacting with the heads and also for projection by the optical assembly of the projector.

BRIEF DESCRIPTION OF THE DRAWINGS

In the accompanying drawing, several preferred embodiments of the invention are shown by way of illustration and not by way of limitation.

In the drawing.

DETAILED DESCRIPTION OF THE DRAWINGS

Figure 1:
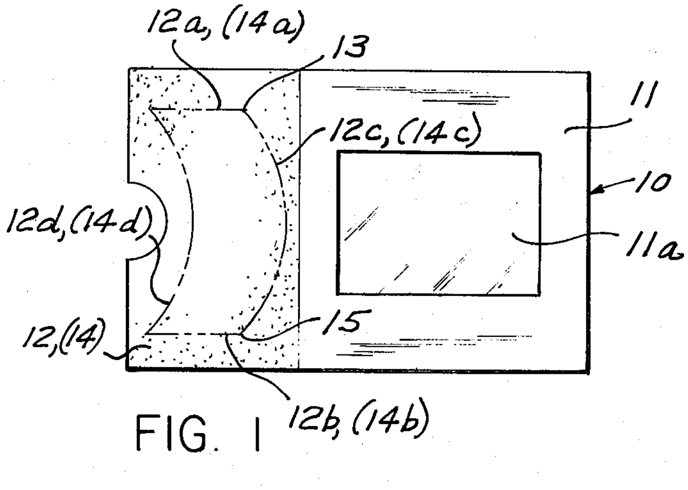
FIG. 1 is a plan view of a sound slide according to the invention for use with a recording and playback mechanism according to the invention.

As previously indicated, the present invention relates to a recording and playback mechanism of a sound slide projector, and also to sound slides suitable for use with the mechanism, but it is not concerned with the optical assembly and the sound assembly of the projector. Accordingly, the drawing figures are limited to the recording and playback mechanism and the sound slide, the optical assembly and the sound assembly, the circuit components and the required connections therefor are presumed to be conventional. The projector may be visualized as being manually operated, that is, the slides must be inserted one-by-one and also withdrawn one-by-one, or as being an automatic projector which accommodates simultaneously a plurality of slides which are successively moved into and out of a presentation position — that is, a position in which the transparency mounted in the slide is projected and the associated message is played back.

Referring now to the figures, and first to FIG. 1, this figure shows a slide 10 which comprises a flat frame 11 including a window or opening in which is mounted a transparency 11*a* in a conventional manner. The frame is also generally conventional, usually made of cardboard or plastic, except that one side of the frame is extended to accommodate a magnetic layer 12 on the visible or upper side of the frame and a similar layer 14 on the opposite or bottom side. The area thus available for recording sound tracks and scanning the same is bounded by an entry edge 12*a* and an exit edge 12*b* for starting a first track 12*c* and an edge 12*d* defining the innermost allowable track. Similarly, for layer 14, the entry edge is 14*a*, the exit edge 14*b*, the starting track 14*c* and the final track edge 14*d*.

Scanning starts at the juncture of lines 12*a* and 12*c* and hence, as will be described hereinafter, the head must contact the magnetic layer at the corner 13 and leaves it at the corner 15. Making the space between the edge of frame 11 and the magnetic layer 12 to be ¼ of an inch, the geometry works out to be approximately 0.9 sec/90° scan time or 3.6 sec/rev at 1⅞ inches/sec which is the standard speed of sound heads. Assuming that 30 seconds playback time are to be available, with tracks approximately 0.28/in. apart, FIg. 1 shows the required area in scale and allows space for a conventional scriber/type follower in a mechanical groove and for adjustments.

As will be noted, the sound tracks are shown to be curved along a circular path for reasons which will appear from the subsequent description.

While the dimensions, the time and speed data as given herein have been found to be practical, the inventive concept is, of course, not limited to the stated dimensions and the time and speed data, but may be modified as desired.

Referring now to the recording and playback mechanism as shown in detail in FIGS. 2 to 6, playback or scanning is described as a matter of convenience, but as it is evident, recording may be carried out in essentially the same and well understood manner.

The exemplified mechanism comprises a stationary assembly 20 including a plate 22 and two vertically supported members 24 and 26. Member 24 spindles a sheave 25 by means of a bearing 28. The sheave has an internal thread 30 engaging a threaded shaft 32 and member 26 is in the shape of an inverted U-bored at its four corners to receive low-friction sleeves 33.

A movable assembly 34 includes a plate 36 in which are fixedly mounted shaft 32 and four slide rods 38 at the four corners to center with sleeve 33 and slide through the same.

A carrier assembly 40 is supported in a rectangular frame 42 fixed to rods 38 by set screws 44. The midpoint of horizontal portions 46 and 48 of frame 42 mount bearings 50, 52 for spindling a shaft 54. This shaft is the carrier for an upper scanner unit 56, a lower scanner unit 58, a commutator 60 and a sheave 62.

Upper scanner 56 includes two heads 64, 68 mounted on leaf springs 64*a*, 68*a*. These heads coact with the layer 12 as will be more fully explained hereinafter. Lower scanner 58 includes two heads 66, 70 mounted on leaf springs 66*a*, 70*a*. Heads 66 and 70 coact with layer 14 as will also be explained hereinafter. The springs are biased to keep the heads normally out of the planes of contact with magnetic layers 12 and 14 previously described.

Assuming that a scanning head rotates about a shaft such as shaft 54 while the shaft is linearly displaced, such head could conceivably scan 180°. However, the required track separation at the entry and the exit edges would make the required areas of the magnetic layers very long, and this in turn would considerably complicate the design of the assembly, and thus of the sound slide projector in which the assembly is to be used. The use of six heads, that is, three on the top layer and three on the bottom layer, would require each head to scan 60°. This is theoretically desirable, but too expensive and complicated; accordingly, the use of four heads, two on each side, appears to be the best choice as it permits an arrangement of the heads so that the heads for each side are spaced 180° — so that the two layers are oriented 90° apart. As a result, each head has to scan 90° and this is an acceptable angle since the overall dimensions of a standard slide frame need to be extended only to acceptable limits. Of course, the concept of the invention encompasses the use of only one pair of heads or more than two pairs if found desirable.

Figure 2:
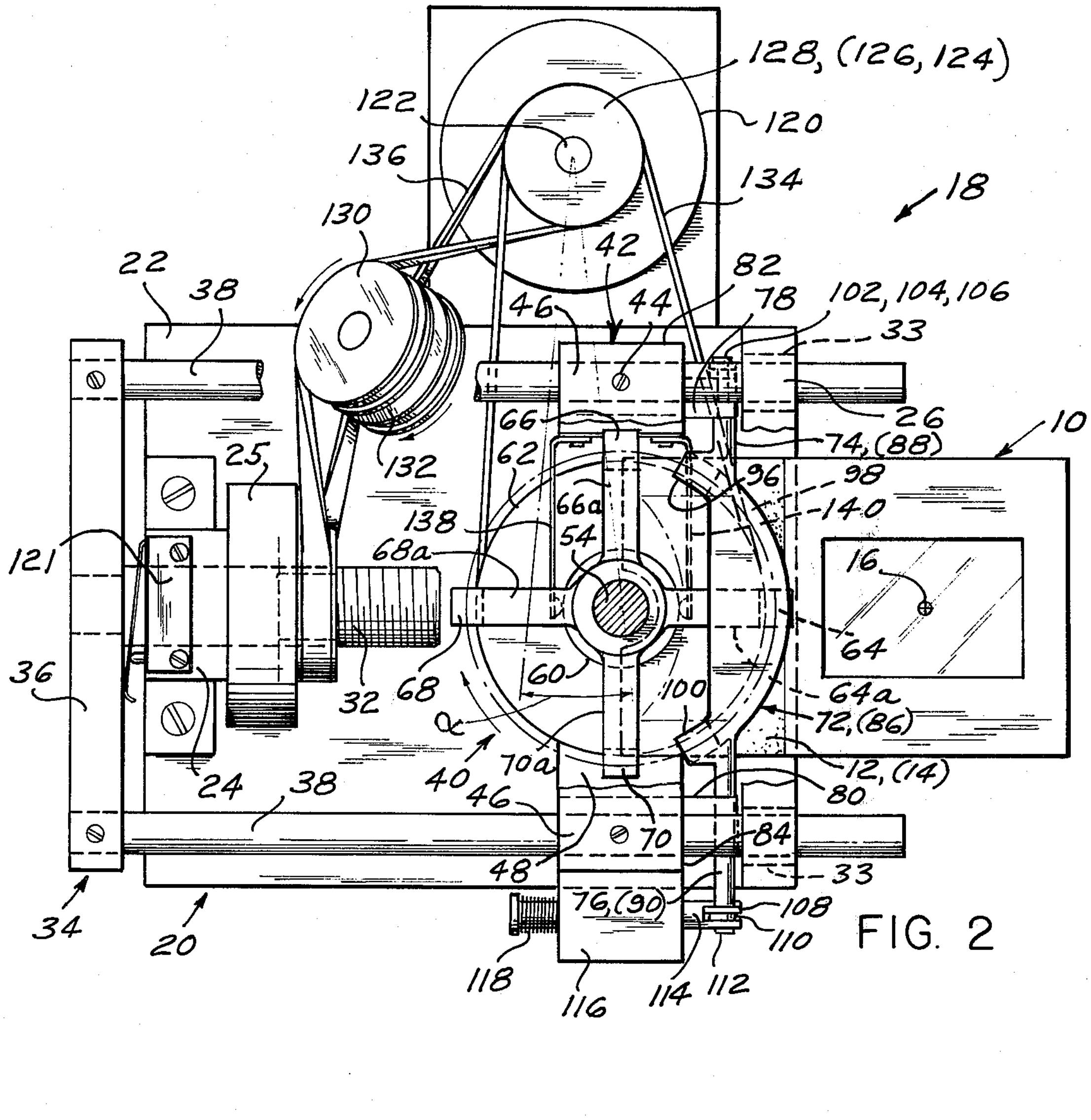
FIG. 2 is a plan view of a recording and playback mechanism arranged for accepting a sound slide according to FIG. 1.

As it is clearly shown, the four heads 64, 68, 66 and 70 are circumferentially spaced and the spacing of the heads is such that insertion of a slide 10 into the recording or playback position in which it is illustrated in FIG. 2, leaves a narrow gap between the heads and layers 12 and 14. It should be noted that the playback position should be visualized as being also the projection position, that is, the center of the transparency accommodated in the slide coincides with a center line 16 of the optical assembly (not shown) of the projector. Moreover, it should be understood that the slide must be so arranged in the assembly that it can be removed either manually or automatically upon the completion of a presentation of the slide, that is, upon projection accompanied by playback of the associated message. Means for inserting or withdrawing of a slide are not shown since, as previously stated, such means would constitute part of projector assemblies which are not essential for the understanding of the invention and should be assumed to be conventional.

As it is apparent from FIG. 2, the heads in the inactive position thereof, that is, in the position in which the heads do not coact with layers 12 and 14, are such that, as previously stated, there is a narrow gap between the heads and the layers, the heads being biased into such positions by the action of the leaf springs 64*a*, 68*a* and 66*a*, 70*a* mounting the heads.

To effect movements of the heads into coaction with the layers, actuating means are provided which will now be described. The actuating means comprise an upper cam 72 having pivot posts 74, 76 journaled in brackets 78, 80 fixed on vertical portions 82, 84 of frame 42. Similarly, a lower cam 86 having pivot posts 88, 90 is journaled in brackets 92, 94. Cam 72 includes a "rise" portion 96, a dwell portion 98 for an angular travel of 90°, and a "fall" portion 100. Similarly, cam 86 includes a rise portion, a dwell portion and a fall portion. Posts 74, 88 terminate in links 102, 104 connected by a rotatable pin 106. Posts 76, 90 terminate in links 108, 110 and are connected by a rotatable pin 112. This pin passes through an actuating rod 114 of a solenoid 116. A spring 118 biases rod 114 into the de-energized position of the solenoid as shown in FIG. 2. In this position the cams are in the operative position, that is, they cause the heads to be in engagement with layers 12 and 14. Energization of the solenoid will move the cams into positions in which the upper scanner 56 including heads 64, 68 and the lower scanner 58 including heads 66, 70 are not in contact with layers 12, 14 on slide 10.

To drive the scanners so that they will both rotate for displacing the heads relative to the layers, a reversible motor 120 drives via its shaft 122 a sheave 124, a unidirectional clutch 126 and a second sheave 128. A belt 136 on sheave 124 connects this sheave to sheave 25. There is indicated in FIG. 2 the angle $\gamma$ through which belt 136 moves as it drives sheave 25. Theoretically, the sheave is driven along a circular path but the curvature is so shallow that it is negligible and hence may be treated as a straight path.

To change the direction from the driving sheave to the driven sheave, a pair of idler pulleys 130, 132 are provided and mounted on a fixed bracket (not shown). Another belt 134 on sheave 128 connects to sheave 62.

Energization of motor 120 in clockwise direction causes scanners 56 and 68 to be returned to the starting position without being rotated by providing speed change means for reversing the rotational direction of the motor; assembly 34 can be returned quickly into its starting position while avoiding an undesirable high speed rotation of the scanners in the opposite direction.

Let it now be assumed that the slide 10 is placed in the playback and projection position and held in this position, a suitable and conventional circuit system (not shown) now energizes motor 120 and playback starts. At any point of either layer 12 or 14 upon completion of the message recorded thereon, a signal recorded in a sound track on one of the layers energizes solenoid 116 thereby causing movement of the heads out of contact with the layers as previously described, and also reverses motor 120. When assembly 34 is returned into its starting position, a reverse running time control which is synchronized with a slide changing mechanism (not shown) actuates a limit switch 121. This actuation of this switch de-energizes solenoid 116 and connects motor 120 for forward drive to begin scanning of the next slide which is presumed to be now positioned in the playing position.

Playback input is obtained by connecting all heads in parallel to commutator rings 60. Brushes 138, 140 coact with these rings. The brushes should be visualized as being suitably connected to the sound assembly of the projector. As previously pointed out, the sound assembly of the projector and its connections are presumed to be conventional and are hence not shown in detail.

Figure 4:
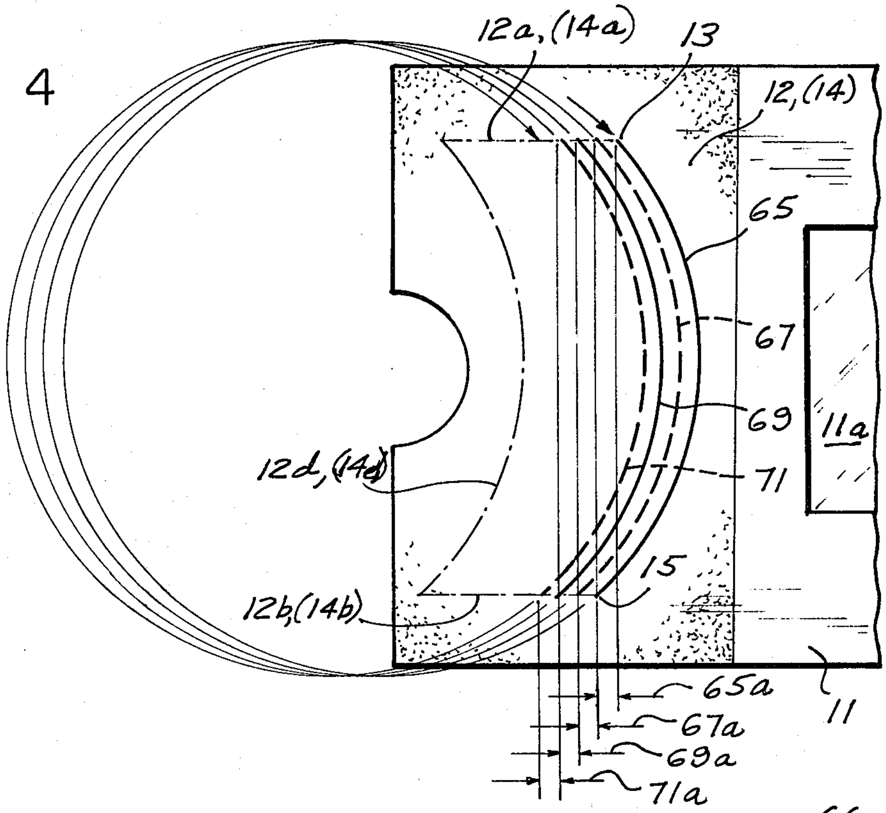
FIG. 4 is a diagram of a continuous path of tracks as recorded or played back by the heads of the mechanism according to FIGS. 2 and 3 on a slide as shown in FIG. 1.
Figure 5:
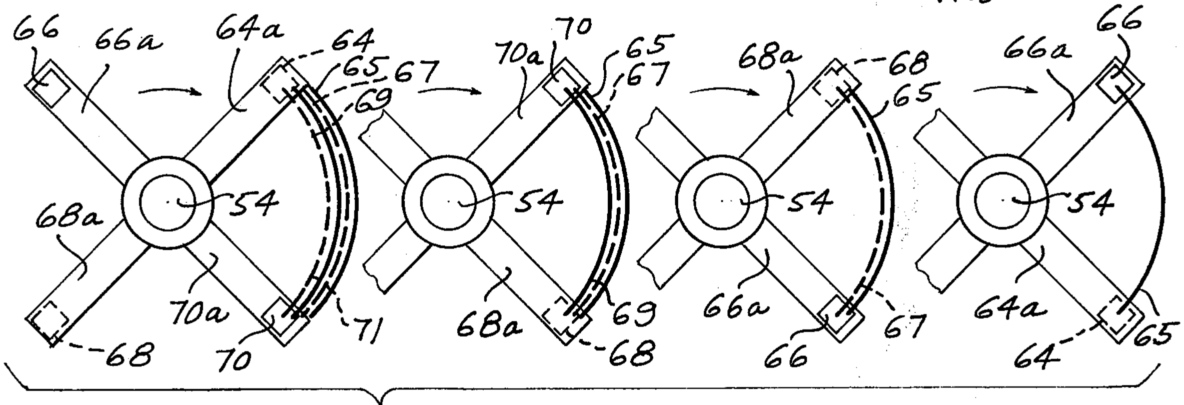
FIG. 5 shows the recording and playback heads of the mechanism in typical different positions during recording and playback.
Figure 6:
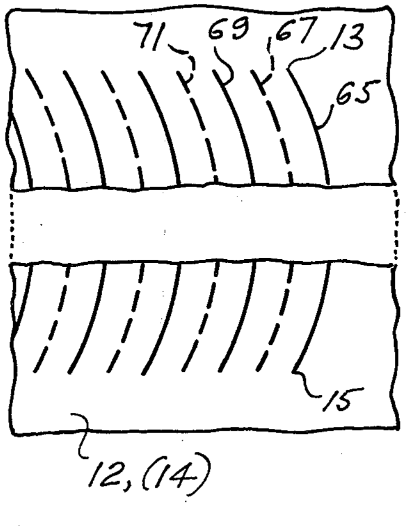
FIG. 6 is a diagrammatic view of a finished sound track pattern on the slide of FIG. 1 on an enlarged scale.

Referring now to FIGS. 4, 5 and 6, these figures show diagrammatically the recording or scanning of sound tracks on layers 12 and 14.

More specifically, FIG. 4 shows in detail the operations by which the sound tracks are recorded or scanned. As stated before, there are four sound heads, namely, heads 64, 68 and 66, 70; heads 64, 68 coact with the top side of the magnetic layer as shown in FIG. 1, that is, layer 12, and heads 66, 70 coact with layer 14, that is, the bottom side.

As further described hereinbefore, the sound heads when in operation are rotated about the center axis of shaft 54 which, in turn, is linearly displaced from right to left as shown in FIG. 2. The sound tracks on top layer 12 are shown in FIG. 4 in full lines and the sound tracks on layer 14 in dashed lines. The recording or scanning starts with sound track 65 on layer 12. The entrance point for this sound track is point 13 as previously described, and the exit point is point 15. However, due to the combined movements imparted to the heads while operating, the heads do not perform a circular movement relative to the layer, but a slightly oval one. Accordingly, point 15 is not on the same line with point 13 as it would be if the heads would rotate only, but is slightly displaced as it is indicated at 65*a*. After completion of line 65 on layer 12, track 16 is recorded or scanned as the first track on the bottom layer 14. Again, the second track is slightly distorted with respect to a circular path as it is indicated at 67*a*. The third sound track 69 is recorded or scanned on layer 12; its distortion is indicated at 69*a* and the fourth layer 71 is recorded or scanned on layer 14. Its distortion is indicated at 71*a*. Such recording or scanning is continued until the innermost track is reached, indicated by 12*d*(14*d*).

FIG. 5 illustrates the specific movements of the four sound heads carried by springs 64*a*, 68*a*, and 66*a*, 70*a*. As indicated before, heads 64, 68 are the upper heads and heads 66, 70 are the lower heads. The figure shows the upper heads with solid lines and the lower heads with dashed lines.

Proceeding from right to left, head 64 has finished the recording or scanning of the first sound track referred to in FIG. 4 as track 65. In the next figure, head 66 has recorded or scanned the second sound track, that is, the first bottom track referred to in FIG. 4 as track 67. In the third figure, head 68 has recorded or scanned the third sound track, that is, the second upper track, and in the fourth figure, head 70 has recorded or scanned the fourth sound track, that is, the second bottom track, and so forth.

Figures 3, 7, 8:
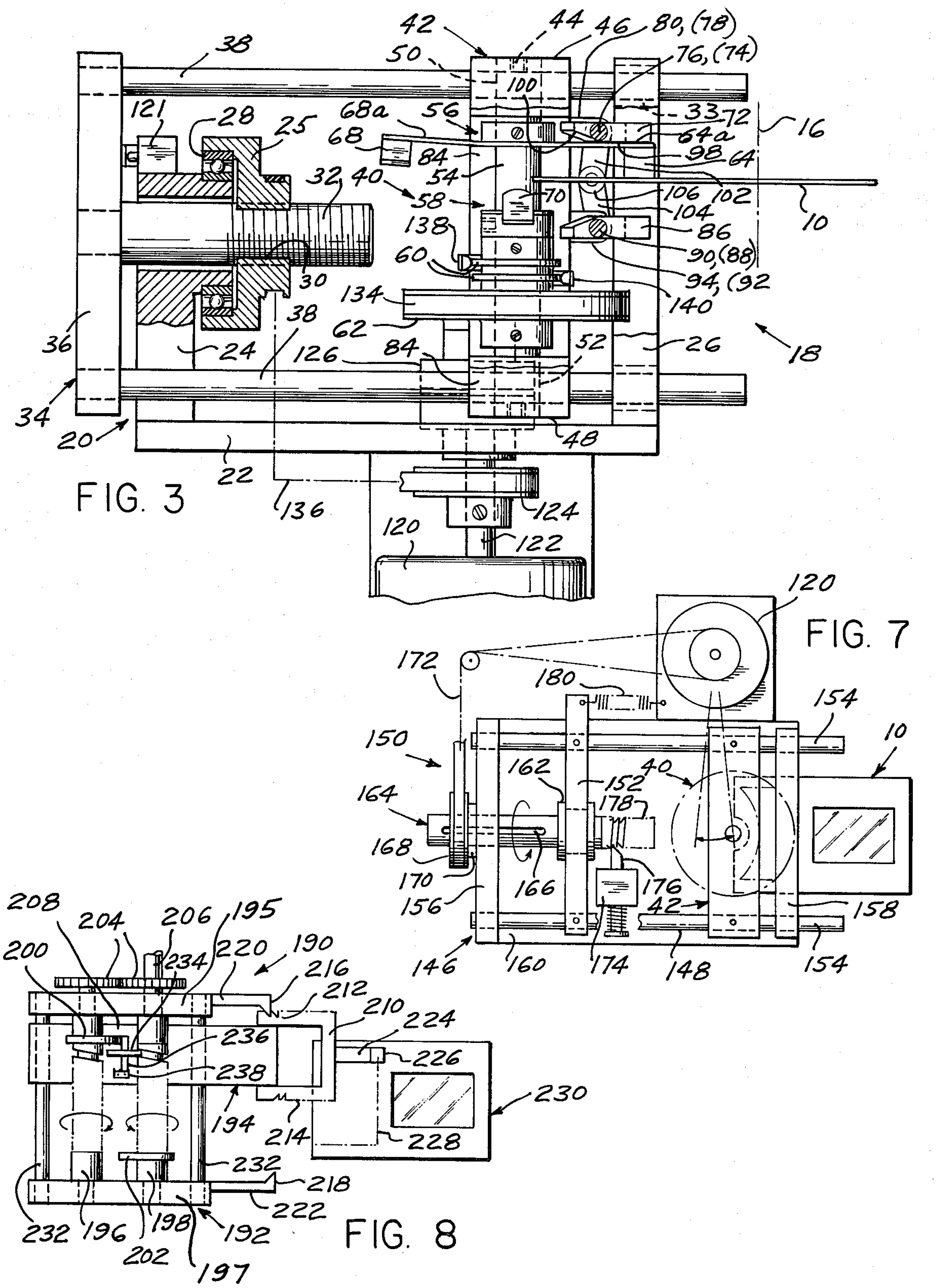
FIG. 3 is a fragmentary elevational view of FIG. 2.
FIG. 7 is a fragmentary plan view of a modification of the recording and playback mechanism according to the invention.
FIG. 8 is a plan view of still another modification of a recording and playback mechanism according to the invention.

Finally, FIG. 6 shows on an enlarged scale the pattern of the top and bottom tracks as are recorded or scanned by the recording and playback assembly according to FIGS. 2 and 3.

As it is now apparent, utilization of both sides of the extension of slide frame 11 at one side thereof permits recording or scanning of a relatively long message without changing the general configuration of slides, thereby facilitating adaptation of conventional sound slide projectors so that the projectors will accept sound slides as disclosed herein an also standard slides.

According to the exemplification of the mechanism as shown in FIG. 7, an assembly 150 for moving frame 42 and rotating head carrier assembly 40 to obtain recorded areas 12 and 14 comprises a stationary assembly 146 and a moving assembly 148.

Moving assembly 148 includes frame 42 and heads assembly 40 pinned to a pair of rods 154. Also pinned to these rods is a bridging member 152 including a bearing 162 which spindles a shaft 164. The shaft is assembled to the bearing in a manner (not shown) so that the shaft can rotate but is constrained against axial movement.

Shaft 164 is provided with a spline 166 along part of its length and at its end facing slide 10 with a steep wall or buttress thread 178.

Stationary assembly 146 comprises a base 160 on which a pair of plates 156 and 158 slidably support rods 154. The frame 42, rods 154, member 152 and shaft 164 can thus move as a unit from left to right.

A bearing 170, set into plate 156, spindles a pulley 168 which has a tooth (not shown that) engages a spline 166. Pulley 168 is driven, as in the previously described embodiment, by motor 120 and a belt 172.

The armature of a solenoid 174 terminates in a pawl 176 movable into and out of engagement with thread 178 on shaft 164.

Finally, a spring 180 connected between bridging member 152 and base 160 biases assembly 148 to the right. The limiting position shown in the figure is at the point where a micro-switch (not shown) similar to switch 121 in FIG. 2, is operated.

FIG. 7 shows the start position of playback or scanning. The micro-switch has engergized solenoid 174, causing pawl 176 to enter thread 178, and has also started the motor. Rotation of shaft 164, as indicated by the arrow, will compel assembly 148 to move smoothly from right to left while motor belt 134 turns heads assembly 40.

Referring to FIG. 8, another modified mechanism 190 of recording and playing back a slide 230, having an adjoining sound recording surface, operates in an alternate scanning mode whereby the recording paths are straight rather than arcuate. Mechanism 190 comprises a stationary assembly 192 and a movable assembly 194.

Assembly 192 includes a base 193 on which are mounted two plates 195 and 197. These plates have affixed therein a pair of slide rods 232. Between these rods, a pair of bearings in each plate 195 and 197 spindle two helically-grooved shafts 196 and 198 which are connected through a pair of identical gears 204 so that rotation is equal and opposed in direction as shown by the arrows. Shaft 198 extends to a driving shaft 206 connected to a motor (not shown). Shaft 196 is provided with a cam 200 at one end and shaft 198 is provided with a cam 202 at the opposite end. An arm 220 on plate 195 is provided with a fixed pawl 216 and an arm 222 on plate 197 is provided with a fixed pawl 218.

Movable assembly 194 comprises a plate 208 and a yoke assembly 210. Plate 208 is provided with low-friction borings for slidable engagement with rods 232. Plate 208 slidably supports yoke 210 so that the yoke can move from right to left. Yoke 210 is machined to include or has attached thereto an opposing pair of movable ratchets 212 and 214. Finally, yoke 210 has an extension 224 to which is affixed a sound recording or playback head 226 for a scanning and recording area 228 on a sound-slide 230.

A cam follower 236 is retained on a plate 208 by means, not shown, in a manner so that it can shift left or right into either one of two positions in a detent 238. Cam follower 236 is moved to the right by turning cam 200 and to the left by turning cam 202. A drive pin 234 attached to the follower thus engages the helix of either shaft 196 or 198 depending upon the action of cam 202 or cam 200, respectively. Thus, on rotating shaft 206, plate 208 shuttles back and forth.

At the end of each traverse, ratchets 212 and 214 engage pawls 216 and 218, respectively, each engagement being translated into a left-directed shift of plate 210. In this manner, area 228 is scanned by moving across in one track and returning in the next track.

By extension of this mode of scanning, plate 210 may have another arm and record/playback head underneath the one shown for application to a sound-slide similar to that of FIG. 1. The only change needed for this purpose, is in the pitch of ratchets 212 and 214. Alternately, one arm and its pawl can be eliminated so that the underlying sound track is directly under the overlying sound track, the left-directed shift taking place once only after each traverse and return of arm 208.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A playback and recording assemblage of a sound-slide projector, said assemblage comprising in combination:

a sound-slide including a frame having a first portion defining a window for accommodating therein a transparency to be projected and a second portion constituting a sound track carrier, said carrier being coated on opposite sides with layers of magnetic material for recording thereon sound tracks and scanning said sound tracks; and a recording and playback mechanism including a pair of sound heads for recording sound tracks on said layers and scanning recorded sound tracks, carrier means supporting said heads in circumferentially spaced relationship, said carrier means being linearly displaceable and rotatable, each of said heads being movable into and out of a position coacting with one of said layers, reversible first drive means coupled with said carrier means for linearly displacing the same parallel to the magnetic layers between a starting position and an end position, said displacement moving the heads across said layers, rotary second drive means coupled to said carrier means for rotating the carrier means when and while the same are driven from the starting position toward the end position, the combined movements imparted to the carrier means by the first and the second drive means causing the heads to move along predetermined paths relative to said layers, actuating means coacting with said heads for alternately moving the same into and out of coacting relationship with said layers when and while the carrier means are displaced toward the said end portion for respectively reocrding on each of said layers sound tracks corresponding to said paths and scanning sound tracks thus recorded on said layers, and for moving both heads out of coacting relationship with the layers when and while the carrier means are displaced toward said starting position, said actuating means including elastic means for each head, each of said elastic means biasing the respective heads into a position disengaged from the layers, and means coacting with said elastic means for movement of the heads into and out of coaction with the layers at predetermined positions of the heads relative to the layers when and while the carrier means supporting the heads are rotated; and stationary holder means for releasably holding said slide in a position for said coaction with said heads.

2. The mechanism according to claim 1 and comprising a second pair of sound heads also supported by said carrier means, said four heads being disposed on the carrier means in circular relationship 90° spaced apart, said actuating means actuating alternate heads to coact with the alternate layers.

3. The mechanism according to claim 2 wherein the two heads of one pair are disposed to coact with the layer on one side of the carrier means and the two heads of the pair coact with the layer on the opposite side of the carrier means, the heads of each pair being supported by the carrier means in diametrically opposite relationship.

4. The mechanism according to claim 1 wherein each of said layers includes mutually parallel sound tracks of arcuate configuration, the convex side of said tracks facing said first portion of the slide frame.

5. The mechanism according to claim 1 wherein one head is disposed to coact with the layer on one side of the slide frame and the other head is disposed to coact with the layer on the other side of the slide frame, and wherein said cam means comprise a pivotably mounted cam for each head, each of said cams being engageable with the spring of the respective head and having a camming surface causing the spring of each head to move the respective head into coaction for a predetermined angular movement of the carrier means during rotation thereof, said movements of the heads into coaction with the layers causing recording or scanning of corresponding sound tracks on said layers.

6. The mechanism according to claim 5 wherein said actuating means further comprise solenoid means coacting with said cams for pivoting the same, said solenoid means being controllable to effect pivoting of the cams at predetermined angular positions of the carrier means.

7. The mechanism according to claim 5 wherein said heads are supported by said carrier means for rotation of the heads along a circular path about a common center axis whereby said heads record or scan approximately circularly curved sound tracks on the layers.

8. The mechanism according to claim 1 and comprising a common power drive means for said first and second drive means, first transmission means coupling said power drive means to the first drive means and second transmission means coupling said power drive means to the second drive means, said first transmission means imparting to the carrier means a linear movement and said second transmission means imparting to the carrier means a rotational movement while the carrier means is moving linearly.

9. The mechanism according to claim 8 wherein said first drive means comprise an axially displaceable threaded shaft coupled to said carrier means for linear displacement thereof in unison with the axial displacement of the shaft, and means engaging the threads on said threaded shaft to effect axial displacement thereof, said means being driven by the first transmission means, and wherein carrier means comprise a rotary shaft disposed normal to the axis of said threaded shaft for displacement of said rotary shaft parallel to its axis upon axial displacement of the carrier means, said heads being mounted for circumferential movement about the center axis of said rotary shaft, and said second transmission means are flexible transmission means permitting said linear displacement of the carrier means when and while said rotary shaft is rotated.

10. The mechanism according to claim 9 wherein said second transmission means comprise a belt coupling said power drive means to said carrier means.

11. The mechanism according to claim 9 wherein said power drive means are reversible power drive means, and wherein said actuating means include means deactivating the same for causing movement of the heads into coaction with the layers upon reversal of the power drive means for return of the carrier means from the end position to the starting position.

12. The mechanism according to claim 1 wherein said means coacting with the elastic means are cam means.

13. A playback and recording assemblage of a sound-slide projector, said assemblage comprising in combination:

a sound-slide including a frame having a first portion defining a window for accommodating therein a transparency to be projected and a second portion constituting a sound track carrier, said carrier being coated on opposite sides with layers of magnetic material for recording thereon sound tracks and scanning said sound tracks; and a recording and playback mechanism including a pair of sound heads for recording sound tracks on said layers and scanning recorded sound tracks, carrier means supporting said heads in circumferentially spaced relationship, said carrier means being linearly displaceable and rotatable, each of said heads being movable into and out of a position coacting with one of said layers, reversible first drive means coupled with said carrier means for linearly displacing the same parallel to the magnetic layers between a starting position and an end position, said displacement moving the heads across said layers, rotary second drive means coupled to said carrier means for rotating the carrier means when and while the same are driven from the starting position toward the end position, the combined movements imparted to the carrier means by the first and the second drive means causing the heads to move along predetermined paths relative to said layers, actuating means coacting with said heads for alternately moving the same into and out of coacting relationship with said layers when and while the carrier means are displaced toward the said end portion for recording in unbroken, continuous fashion a serial message in successive track segments alternately first on one layer and then on the other, and scanning in similar fashion the sound tracks thus recorded on said layers, and for moving both heads out of coacting relationship with the layers when and while the carrier means are displaced toward said starting position; and stationary holder means for releasably holding said slide in a position for said coaction with said heads.

14. A playback and recording assemblage of a sound-slide projector, said assemblage comprising in combination:

a sound-slide including a frame having a first portion defining a window for accommodating therein a transparency to be projected and a second portion constituting a sound track carrier, said carrier being coated on opposite sides with layers of magnetic material for recording thereon sound tracks and scanning said sound tracks; and a recording and playback mechanism including a pair of sound heads for recording sound tracks on said layers and scanning recorded sound tracks, carrier means supporting said heads in circumferentially spaced relationship, said carrier means being linearly displaceable and rotatable, each of said heads being movable into and out of a position coacting with one of said layers, reversible first drive means coupled with said carrier means for linearly displacing the same parallel to the magnetic layers between a starting position and an end position, said displacement moving the heads across said layers, rotary second drive means coupled to said carrier means for rotating the carrier means when and while the same are driven from the starting position toward the end position, the combined movements imparted to the carrier means by the first and second drive means causing the heads to move along predetermined paths relative to said layers, actuating means coacting with said heads for alternately moving the same into and out of coacting relationship with said layers when and while the carrier means are displaced toward the said end portion for recording in unbroken, continuous fashion a serial message in successive track segments alternately first on one layer and then on the other, and scanning in similar fashion the sound tracks thus recorded on said layers, and for moving both heads out of coacting relationship with the layers when and while the carrier means are displaced toward said starting position, said actuating means including elastic means for each head, each of said springs biasing the respective heads into a position disengaged from the layers, and means coacting with said elastic means for movement of the heads into and out of coaction with the layers at predetermined positions of the heads relative to the layers when and while the carrier means supporting the heads are rotated; and stationary holder means for releasably holding said slide in a position for coaction with said heads.

15. A playback and recording assemblage of a sound-slide projector, said assemblage comprising in combination:

a sound-slide including a frame having a first portion defining a window for accommodating therein a transparency to be projected and a second portion constituting a sound track carrier, said carrier being coated on opposite sides with layers of magnetic material for recording thereon sound tracks and scanning said sound tracks; and a recording and playback mechanism including a pair of sound heads for recording sound tracks on said layers and scanning recorded sound tracks and drive means supporting said heads in circumferentially spaced relationship and movable relative to said carrier to form arcuate tracks thereon, and drive means for moving said heads into contact with the layers on the sides of said carrier to record a serial message in successive segments alternately on one layer and then on the other and for reproducing similar fashion by scanning the recorded paths on alternate layers.

16. The mechanism according to claim 15 and comprising a second pair of sound heads also supported on said drive means, said four heads being disposed on the drive means in circular relationship 90° spaced apart.

* * * * *